(12) United States Patent
Yamada et al.

(10) Patent No.: US 7,857,953 B2
(45) Date of Patent: Dec. 28, 2010

(54) OXYGEN-REDUCING GAS DIFFUSION CATHODE AND METHOD OF SODIUM CHLORIDE ELECTROLYSIS

(75) Inventors: Yuji Yamada, Fujisawa (JP); Yuki Izawa, Fujisawa (JP); Masaharu Uno, Fujisawa (JP); Yoshinori Nishiki, Fujisawa (JP); Tsuneto Furuta, Fujisawa (JP)

(73) Assignee: Permelec Electrode Ltd., Kanagawa (JP)

( * ) Notice: Subject to any disclaimer, the term of this patent is extended or adjusted under 35 U.S.C. 154(b) by 1099 days.

(21) Appl. No.: 11/585,979

(22) Filed: Oct. 25, 2006

(65) Prior Publication Data

US 2007/0095676 A1    May 3, 2007

(30) Foreign Application Priority Data

Oct. 31, 2005   (JP)   ............ P.2005-316432

(51) Int. Cl.
*C25B 11/06* (2006.01)
*C25B 11/12* (2006.01)

(52) U.S. Cl. ............ 204/294; 204/252; 204/263; 205/464; 205/477; 205/498; 205/499; 205/510; 429/534

(58) Field of Classification Search ............ 204/294, 204/252, 263; 205/464, 477, 498, 499, 508, 205/510; 429/534
See application file for complete search history.

(56) References Cited

U.S. PATENT DOCUMENTS

| 4,486,276 A | * | 12/1984 | Cohn et al. | ............ 205/524 |
| 4,614,575 A | * | 9/1986 | Juda et al. | ............ 204/265 |
| 5,776,323 A | | 7/1998 | Kobashi | |
| 2004/0206624 A1 | * | 10/2004 | Hosonuma et al. | ............ 204/294 |
| 2006/0066203 A1 | * | 3/2006 | Uno et al. | ............ 313/311 |

* cited by examiner

Primary Examiner—Bruce F Bell
(74) Attorney, Agent, or Firm—Sughrue Mion, PLLC (57) ABSTRACT

The present invention provides an oxygen-reduction gas diffusion cathode having: a porous conductive substrate; diamond particle having a hydrophobic surface; and catalyst particle, the diamond particle and the catalyst particle being disposed on the porous conductive substrate, and a method of sodium chloride electrolysis using the cathode.

7 Claims, 3 Drawing Sheets

OXYGEN-REDUCING GAS DIFFUSION CATHODE AND METHOD OF SODIUM CHLORIDE ELECTROLYSIS

FIELD OF THE INVENTION

The present invention relates to an oxygen gas diffusion cathode and a method of sodium chloride electrolysis with the cathode. More particularly, the invention relates to an oxygen gas diffusion cathode capable of retaining hydrophobicity to have improved durability, and to a method of sodium chloride electrolysis with this cathode.

BACKGROUND OF THE INVENTION

Fuel Cell

A fuel cell is a clean and high-efficient power-generating system capable of converting chemical energy to electrical energy. In the cell, the oxidation reaction of hydrogen or an organic carbon material is conducted in combination with the reduction reaction of oxygen present in air and electrical energy is obtained from the resultant electromotive force. After having received attention with respect to practical use as low-temperature type cells used in outer space especially in the 1960s, fuel cells are recently attracting attention again for use in fuel-cell vehicles and as small portable power sources or domestic power sources. Although hydrogen and methanol are generally used as fuels, other organic substances such as, e.g., ethanol and ethylene glycol are usable. Recent technical progress is described in detail in, e.g., "Technologies of Fuel Cells and Applications Thereof", Technosystem Co. (2001); "New Developments of Electrode Catalyst Science", Hokkaido University Tosho Kanko-kai (2001); and "Fuel Cell", Maruzen (2005).

A gas diffusion electrode is characterized by supplying a reactant gas to the electrode surface and undergoing an oxidation or reduction reaction of the gas on the electrode. Gas diffusion electrodes have been developed mainly for use in fuel cells.

Use of Oxygen Gas Diffusion Electrode in Industrial Electrolysis

Use of an oxygen gas diffusion electrode in industrial electrolysis has recently come to be investigated. For example, a hydrophobic cathode for conducting an oxygen reduction reaction is used in an apparatus for the electrolytic production of hydrogen peroxide. Furthermore, in processes for alkali production or acid/alkali recovery, a hydrogen oxidation reaction (hydrogen anode) as a substitute for oxygen generation on the anode or an oxygen reduction reaction (oxygen cathode) as a substitute for hydrogen generation on the cathode is conducted using a gas diffusion electrode to thereby attain a reduction in power consumption. It has been reported that when a hydrogen anode is used as the counter electrode in metal recovery, e.g., zinc collection, or zinc plating, depolarization is possible.

Caustic soda (sodium hydroxide) and chlorine, which are important industrial raw materials, are being produced mainly by the sodium chloride electrolysis method. This electrolytic process has shifted through the mercury method, in which a mercury cathode is used, and the diaphragm method, in which an asbestos diaphragm and a soft-iron cathode are used, to the ion-exchange membrane method, in which an ion-exchange membrane is used as a diaphragm and an active cathode having a low overvoltage is used. Through this progress, the electric power consumption rate required for the production of 1 ton of caustic soda has decreased to 2,000 kWh. However, since caustic soda production is a large-electrical-consumption industry, a further reduction in electric power consumption rate is desired.

In a conventional method of electrolysis, the anode reaction and cathode reaction are respectively as shown by schemes (1) and (2), and the theoretical decomposition voltage is 2.19 V.

$$2Cl^- \rightarrow Cl_2 + 2e \quad (1.36\ V) \tag{1}$$

$$2H_2O + 2e \rightarrow 2OH^- + H_2 \quad (-0.83\ V) \tag{2}$$

When an oxygen cathode is employed in place of conducting the hydrogen-generating cathode reaction, the reaction shown by scheme (3) takes place. As a result, the cell voltage can be reduced theoretically by 1.23 V, or by about 0.8 V when the current density is in a practical range. Namely, a reduction in electrical power consumption rate of 700 kWh per ton of sodium hydroxide can be expected.

$$O_2 + 2H_2O + 4e \rightarrow 4OH^- \quad (0.40\ V) \tag{3}$$

Because of this, investigations have been made since the 1980s on the practical use of a sodium chloride electrolysis process employing a gas diffusion electrode. However, it is indispensable for realizing this process to develop an oxygen cathode which has high performance and is sufficiently stable in the electrolysis system.

Oxygen gas cathodes in sodium chloride electrolysis are described in detail in "Domestic/overseas Situation Concerning Oxygen Cathodes for Sodium Chloride Electrolysis", Soda and Chlorine, Vol. 45, 85(1994).

Gas Diffusion Electrode for Sodium Chloride Electrolysis

The electrolytic cell used in the currently most general method of sodium chloride electrolysis employing an oxygen cathode is of the type in which the oxygen cathode is disposed on the cathode side of a cation-exchange membrane through a cathode chamber (caustic chamber) and oxygen as a feed material is supplied from a gas chamber disposed at the back of the cathode. This cell is constituted of three chambers, i.e., an anode chamber, a catholyte chamber, and a cathode gas chamber, and is hence called a three-chamber type electrolytic cell. The oxygen supplied to the gas chamber diffuses into the electrode and reacts with water in the catalyst layer to yield sodium hydroxide. Consequently, the cathode to be used in this electrolysis method should be a gas diffusion electrode of the so-called gas/liquid separation type which is sufficiently permeable to oxygen only and does not leak the sodium hydroxide solution to the gas chamber. A gas diffusion electrode comprising an electrode substrate obtained by mixing a carbon powder with PTFE and molding the mixture into a sheet and a catalyst, such as, e.g., silver or platinum, deposition on the substrate has been proposed as an electrode satisfying those requirements.

However, this type of electrolysis method has some problems. The carbon powder used as an electrode material readily deteriorates at high temperatures in the presence of both sodium hydroxide and oxygen to considerably reduce electrode performance. With an increase in liquid pressure and electrode deterioration, the sodium hydroxide solution yielded comes to leak out to the gas chamber. This leakage is difficult to prevent especially in large electrolytic cells.

For overcoming those problems, a novel electrolytic cell was proposed. This electrolytic cell is characterized in that an oxygen cathode is disposed so as to be in close contact with an ion-exchange membrane (zero-gap structure) and that oxygen and water as feed materials are supplied from the electrode back side and the sodium hydroxide yielded as a reaction product is recovered from the back side or a lower part of the electrode. When this electrolytic cell is used, the problem concerning sodium hydroxide leakage is eliminated and partition into a cathode chamber (caustic chamber) and a gas chamber becomes unnecessary. Since this cell is constituted of two chambers, i.e., a chamber combining a gas chamber with a cathode chamber (caustic chamber) and an anode chamber, it is called a two-chamber type electrolytic cell.

The performances required of the oxygen cathode suitable for use in electrolytic processes employing this electrolytic cell considerably differ from those required of conventional ones. Because the sodium hydroxide solution which has leaked out to the back side of the electrode is recovered, the electrode need not have the function of separating a caustic chamber from a gas chamber and need not have a united structure. In addition, size enlargement is relatively easy.

Even when that gas diffusion electrode is used, the sodium hydroxide yielded not only moves to the back side but moves in the height direction due to gravity. Because of this, there is a problem that when the sodium hydroxide yielded is present in excess, a sodium hydroxide solution resides in the electrode to inhibit gas supply. It is necessary that the gas diffusion electrode should have: sufficient gas permeability; sufficient hydrophobicity for avoiding wetting by a sodium hydroxide solution; and hydrophilicity for enabling a sodium hydroxide solution to readily pass through the electrode. A technique for satisfying these requirements is proposed in Japanese Patent No. 3553775 which comprises disposing a hydrophilic layer between an ion-exchange membrane and an electrode.

An electrolytic cell which is intermediate between those electrolytic cells has been developed. It is a liquid dropping type electrolytic cell in which a gas electrode having gas/liquid permeability is disposed slightly apart from a membrane and an alkali solution is introduced from an upper part and caused to flow through the gap between these (U.S. Pat. No. 4,486,276).

However, those industrial electrolysis systems have a problem that the gas diffusion electrodes cannot have a sufficient life and sufficient performances because the operating conditions are severe as compared with the case of fuel cells. In particular, there are problems concerning a decrease in hydrophobicity and concerning catalyst size reduction.

Decrease in Hydrophobicity

It is known that electrochemical oxygen reduction yields active chemical oxygen species including hydrogen peroxide. Namely, although it is preferred in the electrochemical reduction of oxygen to synthesize hydroxide ions only through reduction with four electrons as shown by scheme (3)', hydrogen peroxide synthesis as shown in scheme (4) occurs depending on the catalyst material and operating conditions.

$$O_2 + 2H_2O + 4e \rightarrow 4OH^- \quad (0.40\,V) \tag{3'}$$

$$O_2 + H_2O + 2e \rightarrow HO_2^- + OH^- \quad (-0.08\,V) \tag{4}$$

Proposed as elementary processes for the synthesis are, e.g., the reactions represented by schemes (5) to (7) which occur on a catalyst (CAT).

$$CAT + O_2 + e \rightarrow CAT\text{-}O_2^- \tag{5}$$

$$CAT\text{-}O_2^- + H_2O \rightarrow CAT\text{-}O_2H + OH^- \tag{6}$$

$$CAT\text{-}O_2H + e \rightarrow HO_2^- + CAT \tag{7}$$

A subsequent reaction is known in which the hydrogen peroxide ion undergoes reductional decomposition on the electrode according to scheme (8).

$$HO_2^- + H_2O + 2e \rightarrow 3OH^- \tag{8}$$

The hydrogen peroxide thus yielded separates from the electrode surface and diffuses into the solution. The decomposition is hence apt to proceed catalytically. When a metal M is present, active oxygen species other than hydrogen peroxide generate according to schemes (9) to (11).

$$M + H_2O_2 = M(+) + OH\cdot + OH^- \tag{9}$$

$$OH\cdot + H_2O_2 = HO_2\cdot + H_2O \tag{10}$$

$$HO_2^- + M(+) = HO_2\cdot + M \tag{11}$$

The hydrogen peroxide and active oxygen species react with the carbon particle surface, the surface of the carbon fibers as a porous support, and the surface of the fluororesin, ion-exchange membrane, etc. to reduce hydrophobicity, oxidatively consume the carbon, and break the ion-exchange membrane. This results in a decrease in the function of the gas electrode and leads to deterioration of electrolytic performance. When a platinum catalyst is used, the reduction with four electrons proceeds and, hence, such problems are less apt to arise. However, because this catalyst is expensive and frequently used in a minimal amount, the deposition thereof on a support (fine carbon particles) is apt to leave substrate surfaces exposed. Although carbon has poor activity, the exposed surfaces thereof present in an increased area are capable of reducing part of the oxygen to generate the active oxygen species. This has become a problem (see Electrochemical and Solid State Lett., 7, A474-A476(2004) and Phys. Chem. Chem. Phys., 6, 2891-2894(2004)).

Investigations have been made on inexpensive catalysts usable as a substitute for platinum. In an alkaline region, oxides in the spinel form, perovskite form, or pyrochlore form, manganese dioxide (in particular, γ-MnOOH is the best), and the like are excellent. Metal chelate complexes also are highly active, and investigations are being made especially on coordination complexes such as a porphyrin or phthalocyanine including a nickel, cobalt, or iron ion as the central metal. It has been reported that catalysts obtained by heat-treating these complexes also have improved activity (see Electrochemical Hydrogen Technologies, ELSEVIER, (1990)).

However, when those oxides and organic-ligand catalysts are used, the reduction with two electrons is apt to mainly proceed and, hence, the problems described above remain unsolved. A silver catalyst ingredient is durable and in general use. However, even when this catalyst is used, the reduction with two electrons partly proceeds and the deterioration cannot be completely prevented.

Problems Aroused by Catalyst Size Reduction

In fuel cell systems, a carbon powder of several tens of nanometers is commonly used as a support for a catalyst, and the catalyst is deposited on the surface thereof in the form of particles dispersed on the order of nanometer. On the other hand, in sodium chloride electrolysis systems, a high-concentration aqueous alkali solution is yielded at the oxygen cathode according to scheme (3) and the cathode is required to have better water discharge ability than in fuel cell systems. In general, as the electrode particles used become smaller, the effective electrode area increases and a performance improvement should be expected accordingly. However, in case where the cathode has insufficient water discharge function, the fine pores located near the electrode particles are wholly filled with the alkali solution. As a result, the feed gas cannot be supplied to the reaction surface and the expected performance improvement cannot be attained.

In JP-T-2002-073722 is disclosed a gas diffusion electrode which has a multilayer structure formed by alternately disposing a first layer at least comprising conductive particles and a second layer comprising a catalyst material and in which the conductive particles are characterized by being carbon, having an ion-conductive coating film, and having a water-repellent coating film. This reference shows carbonaceous materials including carbon clusters, which are aggregates of carbon atoms, and a tubular carbon material (so-called carbon nanotubes) as examples of the carbonaceous material to be used as the substrate to which ionic conductivity is to be imparted. Furthermore, there is a description therein to the effect that preferred examples of the carbon clusters are fullerenes, ones having a fullerene structure which at least partly has an open end, and ones having a diamond structure. However, this reference includes no statement concerning the impartation of hydrophobicity with diamond.

JP-A-2004-235080 discloses a catalyst-bonded electrode for fuel cells which includes conductive diamond having a catalyst layer formed on the surface thereof. This reference includes no statement concerning diamond as a hydrophobic material.

JP-A-2001-307747 discloses use of a diamond ingredient on a separator surface. However, this reference includes no statement concerning the ingredient as a hydrophobic material.

JP-T-2001-519594 discloses a nanostructure element for use in electrochemical cells which comprises an acicular microstructure support whisker supporting acicular microfine catalyst particles. This reference shows diamond as one of useful inorganic materials for producing the microstructure. There is a description therein to the effect that the aspect ratio (i.e., length-to-diameter ratio) of the microstructure is preferably from about 3:1 to about 100:1. Namely, the shape of the microstructure disclosed is limited to whisker shapes.

JP-A-2004-6240 discloses that carbon nanotubes, diamond produced by plasma CVD, or the like is used as an active electrode material besides active carbon. However, this reference includes no statement concerning the impartation of hydrophobicity.

JP-A-2004-292231 and JP-A-2004-323292 disclose a process for producing a nanocarbon material for use as a carbon material for supporting a catalyst in fuel cells. However, these references include no statement concerning the impartation of hydrophobicity.

JP-A-2001-348296 discloses diamond having an acicular surface, a carbonaceous material having a ciliated surface, a process for producing the material, and an electrode employing the same. However, the shape is limited, and this reference includes no statement concerning the impartation of hydrophobicity.

JP-A-2004-22471 discloses a cell for fuel cells which comprises a fuel electrode layer, a modified catalyst layer, and a heat conduction layer interposed between these and in which the heat conduction layer comprises a material selected from the group consisting of aluminum, iron, nickel, copper, silver, diamond-like carbon, silicon carbide, and silicon nitride.

JP-A-2003-272649 discloses a metallic separator for fuel cells.

As apparent from the explanation given above, none of those references includes a statement concerning use of diamond particles as a hydrophobic material.

SUMMARY OF THE INVENTION

An object of the present invention is to provide an excellent gas diffusion electrode which prevents the decrease in gas electrode performance due to the active oxygen species described above generated by oxygen reduction, in particular, the decrease in the ability to supply oxygen gas, and in which even fine catalyst particles can sufficiently participate in reactions.

The present inventors have made eager investigation to examine the problem. As a result, it has been found that the foregoing objects can be achieved by the following oxygen-reduction gas diffusion cathodes and method of sodium chloride electrolysis. With this finding, the present invention is accomplished.

The present invention is mainly directed to the following items:

1. An oxygen-reduction gas diffusion cathode comprising: a porous conductive substrate; a diamond particle having a hydrophobic surface; and a catalyst particle, the diamond particle and the catalyst particle being disposed on the porous conductive substrate.

2. The oxygen-reduction gas diffusion cathode according to item 1, wherein the diamond particle is fluorinated.

3. The oxygen-reduction gas diffusion cathode according to item 1, wherein the diamond particle has an insulation property.

4. The oxygen-reduction gas diffusion cathode according to item 1, wherein the diamond particle and the catalyst particle are bonded by a fluororesin.

5. The oxygen-reduction gas diffusion cathode according to item 1, wherein the diamond particle has a diameter equal to or smaller than that of the catalyst particle.

6. The oxygen-reduction gas diffusion cathode according to item 1, wherein the amount of the diamond particles is 0.01 to 1 part by volume with respect to one part by volume of the catalyst particles.

7. A method of sodium chloride electrolysis in an electrolytic cell, the electrolytic cell comprising: a cathode chamber and an anode chamber partitioned by an ion-exchange membrane; an oxygen-reduction gas cathode for sodium chloride electrolysis comprising a porous conductive substrate and an electrode catalyst disposed on the porous conductive substrate, the oxygen-reduction gas cathode being disposed in the cathode chamber; and an anode coated with a platinum group metal oxide, the anode being disposed in the anode chamber, the method comprising conducting an electrolysis while supplying a sodium chloride solution and an oxygen-including gas to the anode chamber and the cathode chamber, respectively, to produce a sodium hydroxide in the cathode chamber, the electrode catalyst comprising: a diamond particle having a hydrophobic surface; and a catalyst particle.

The invention will be explained below in detail.

The cathode of the invention is a gas diffusion electrode for oxygen reduction which comprises a porous conductive substrate and, deposited thereon, substances comprising diamond particles or diamond-like carbon (DLC) particles (in the invention, these two particulate materials are inclusively referred to as diamond particles) and catalyst particles, and in which the diamond particles have a hydrophobic surface. Due to this constitution, the problems described above can be overcome.

The gas diffusion cathode of the invention is suitable for use as a cathode for sodium chloride electrolysis, which is a process conducted under severe electrolysis conditions among electrolytic reactions. Besides being used in this application, the cathode can be used in fuel cells and other processes employing a gas diffusion electrode. In each of such applications, the cathode has the effect of improving durability.

The reasons why the problems described above are overcome will be explained below by reference to drawings using, as examples, embodiments in which diamond particles are bonded to catalyst particles with a hydrophobic resin, e.g., a fluororesin.

Figure 1:
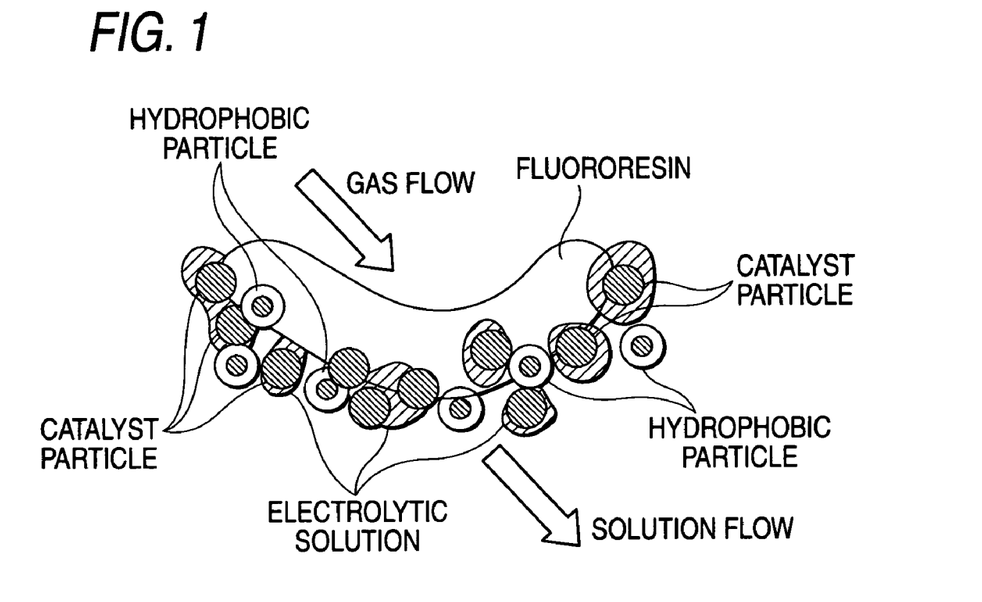
FIG. 1 is a diagrammatic view illustrating one embodiment of electrode materials in the invention in which diamond particles have been bonded to catalyst particles with a fluororesin as a binder.
Figure 2:
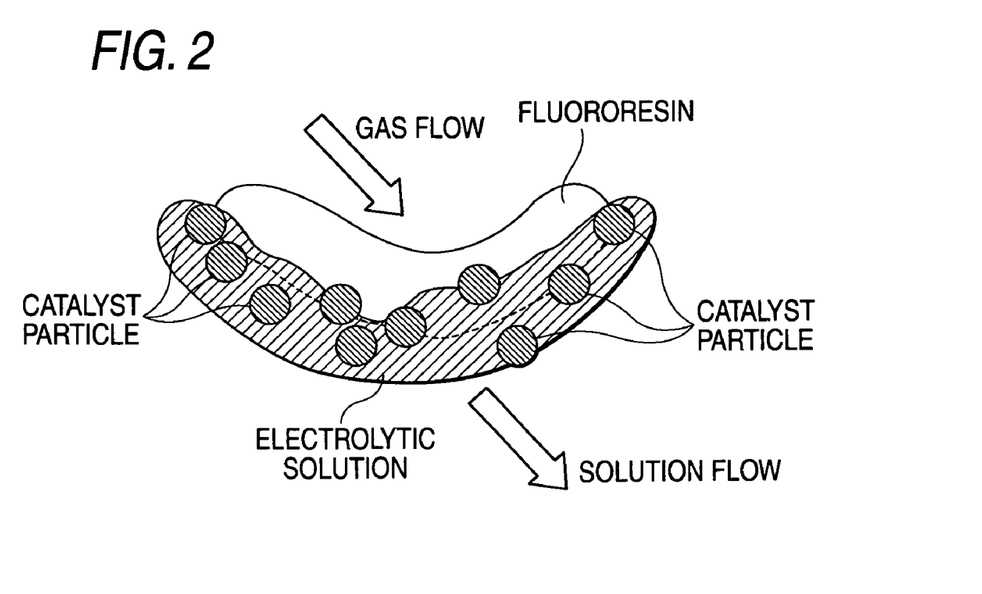
FIG. 2 is a diagrammatic view illustrating an embodiment of an electrode material in a conventional-art technique in which catalyst particles have been deposited on a fluororesin.

FIG. 1 is a diagrammatic view illustrating the state of electrode materials in one embodiment of the invention in which diamond particles have been bonded to catalyst particles with a fluororesin as a binder. FIG. 2 is a diagrammatic view illustrating the state of an electrode material in a conventional-art technique in which catalyst particles have been deposited on a fluororesin.

In the case of the electrode materials shown in FIG. 1, which include diamond particles, an electrolytic solution or a solution containing a reaction product does not come into contact with the diamond particles having an ultrahydrophobic surface due to a lotus effect. Furthermore, since the diamond particles are present among the catalyst particles, the electrolytic solution is not continuous between the catalyst particles and the electrolytic solution or the like is present in a thin film or thin layer form around each catalyst particle as shown in the drawing. Consequently, a gas supply network is always formed and gas supply is maintained. Thus, the electrolytic solution or the like thinly localizes on the hydrophilic surface of the fine catalyst particles. Except that the electrolytic solution or the like thus behaves, it rapidly moves outward.

Thus, the fluororesin surface has a larger amount of spaces and this makes the supply of a reactant gas, e.g., oxygen, smooth. Furthermore, since the catalyst particles are not immersed in the electrolytic solution or the like but merely exposed to a gas phase or covered with a thin liquid layer of the electrolytic solution or the like, the reaction-accelerating function of the catalyst particles suffers substantially no deterioration. In addition, since the diamond particles have hydrophobicity, the electrode materials have resistance to the phenomenon in which the active oxygen species generated by the oxygen reduction reaction, e.g., hydrogen peroxide, reduce the hydrophobicity of the electrode. Life prolongation can hence be attained. Also in the case where diamond particles and catalyst particles are deposited directly on a porous conductive substrate without using a fluororesin, the prevention of deterioration of the reaction-accelerating function of the catalyst particles and the prolongation of the electrode life can be attained by the same mechanism on the surface of the porous conductive substrate.

In contrast, in the electrode material shown in FIG. 2, which includes no diamond particles, a liquid layer of an electrolytic solution or the like is formed thickly. As a result, the catalyst particles are immersed in the electrolytic solution or the like and many catalyst particles cannot come into contact with a reactant gas. The reaction-accelerating function of the catalyst particles are hence deteriorated. In addition, the average thickness of the liquid layer of the electrolytic solution or the like is larger than that in FIG. 1 and, hence, the dissolution and diffusion of oxygen gas become slower. Furthermore, the electrode as a whole has insufficient hydrophobicity, and the hydrophobicity of the electrode is reduced by the active hydrogen species generated by the oxygen reduction reaction. The electrode life is hence shortened.

A comparison between FIG. 1 and FIG. 2 clearly shows the effects of the mixing of diamond particles having a hydrophobic surface with catalyst particles.

The diamond particles may have electrical conductivity or may have no conductivity. Among them, the diamond particles preferably have an insulation property. Furthermore, the diamond particles are preferably fluorinated, since when the particles have been fluorinated, they have improved hydrophobicity and more effectively function.

In the invention, the diamond particles and the catalyst particles are disposed on a porous conductive substance. It is preferable that the diamond particles are bonded to the catalyst particles with a hydrophobic resin functioning as a binder, such as, e.g., a fluororesin, as shown in FIG. 1. Besides, the material to be used for the porous conductive substrate preferably is a carbon powder or carbon fibers.

When such hydrophobic particles, i.e., diamond particles having a hydrophobic surface, are used, the hydrophobicity required for gas supply is maintained because these particles have resistance to active oxygen, whereby the electrode performance is stable over long. It is favorable that raw-material particles of a nanometer order size are on the market and catalyst particles having the same size as these are also available. A gas diffusion electrode for industrial electrolysis produced with these particles and having fine gas/liquid permeability has a network of hydrophobic particles which is capable of supplying oxygen gas to fine parts. In this electrode, a thin liquid layer can be maintained. Consequently, the supply of oxygen gas is not a rate-determining step and, hence, the oxygen reduction reaction on the electrode surface is not inhibited even when a high current is caused to flow.

The invention provides a gas diffusion cathode for oxygen reduction which has electrode materials comprising diamond particles having hydrophobicity and catalyst particles. By mixing the diamond particles with a catalyst which has been generally used, an electrode is obtained which retains hydrophobicity and has improved durability. Even in the case of fine catalyst particles which, in techniques heretofore in use, are covered with an electrolytic solution or a solution containing a reaction product and have not been capable of exhibiting the electrolytic performance inherent therein, they can exhibit the inherent high performance when used as a mixture with the diamond particles because a fine network for supplying a reactant gas is formed.

Furthermore, with the continuation of electrolysis, self-aggregation of the active catalyst is apt to gradually proceed. However, the diamond particles are stably present among the catalyst particles and can hence be expected to produce the effect of inhibiting the self-aggregation.

The reference numerals used in the drawings denote the followings, respectively.

1 electrolytic cell
2 cation-exchange membrane
3 anode chamber
4 cathode chamber
5 anode
6 gas diffusion cathode
7 catholyte chamber
8 cathode gas chamber

DETAILED DESCRIPTION OF THE INVENTION

Constituent members of the gas diffusion cathode for oxygen reduction will be explained below in detail.

Diamond Particles

Diamond particles having a hydrophobic surface are used as a hydrophobic particulate material in the invention. Hydrogen atoms bonded to the surface impart hydrophobicity. Fine diamond particles of a nanometer-order size for industrial use as, e.g., abrasive materials are mass-produced. Such diamond particles can be used as a material for the gas electrode without posing any problem concerning quality. Thus, a new market can be provided.

It is preferable to conduct a fluorination treatment to the diamond particle so as to impart a higher degree of hydrophobicity. For the fluorination treatment of diamond particles, use can be made of a thermal fluorination treatment, electrolytic fluorination treatment, plasma fluorination treatment, or the like. However, from the standpoint of ease of application to the fluorination treatment of a large amount of diamond particles, a thermal fluorination treatment and an electrolytic fluorination treatment are preferred.

Examples of the fluorine source to be used for the thermal fluorination treatment include a gas such as fluorine, nitrogen fluoride, or carbon fluoride. A commercial gas or a gas synthesized by an electrolytic reaction can be directly used. The fluorine source can be used optionally after having been diluted to 1-100 vol % with an inert gas such as nitrogen, argon, or helium. A slight amount of oxygen may be added in order to accelerate the fluorination reaction. It is preferable that the fluorine-containing gas is supplied to the material to be fluorinated, and the fluorination reaction is caused to proceed at a treatment temperature of 0-600° C. and a treatment pressure of 50-760 Torr.

An Example of the electrolytic bath to be used for the electrolytic fluorination treatment is a molten salt such as, e.g., a KF.2HF bath. The electrolytic-bath temperature is preferably kept at 70-100° C. Water can be added to the electrolytic bath in an amount of 10-100 ppm in order to accelerate the fluorination reaction. In an example of the fluorination treatment, the particles to be fluorinated are added to and dispersed in the bath, and the fluorination reaction is caused to proceed at a current density, which is preferably in a range of 1-100 A/dm$^2$.

The diamond particles may have insulating properties (non-conductivity) or may be conductive. However, when using conductive diamond particles, for obtaining the same conductivity as the catalyst or graphite, it is necessary to dope the particles with a large amount of boron.

The size of the diamond particles is preferably from 1 nm to 100 nm. The size thereof may be regulated so as to be suitable for the size of the catalyst to be used. It is preferred to use diamond particles having a size equal to or smaller than that of the catalyst particles.

The diamond particles having a hydrophobic surface which are usable in the invention should have durability in an alkali atmosphere at high temperatures and an oxygen reduction potential.

In case where the amount of the hydrophobic material used is larger than a proper amount, oxygen gas dissolves to form a reaction surface and, hence, the discharge of the electrolytic solution or the like is excessively accelerated. As a result, the performance is reduced rather than increased. Consequently, the proportion of the hydrophobic material to be added is preferably from 0.01 to 1 part by volume per one part by volume of the catalyst particles.

The diamond particles in the invention preferably are ones which have a minimal amount of or no bonds other than sp$^3$ bonds, which are chemically stable. Other materials having a microstructure, such as graphite, fullerenes, or CNT, cannot be used because the structural breakage of these materials themselves proceeds.

Catalyst Particles

The kind of catalyst to be used in the gas diffusion cathode for oxygen reduction of the invention may be suitably selected according to the intended application thereof.

For example, the catalyst for sodium chloride electrolysis preferably is stable in high-temperature alkalis and inexpensive. It is preferred to select silver or a silver alloy (containing copper, platinum, or palladium in a small amount). These catalysts to be used may be commercial particles, or may be ones synthesized by a known method. It is preferred to employ a wet process in which an aqueous solution of silver nitrate or of silver nitrate and palladium nitrate is mixed with a reducing agent to synthesize the target particles. Alternatively, a dry process such as vapor deposition or sputtering may be used for synthesis.

The particle diameter of the catalyst particles is preferably 0.001-1 μm.

The catalyst particles are used as a mixture with the diamond particles described above. It is desirable that the catalyst particles should have a larger particle diameter than the diamond particles. In this case, a preferred form is one in which one or more diamond particles adhere to the surface of each catalyst particle.

The catalyst particles preferably are a catalyst ingredient stable in high-temperature alkalis. Preferred besides the catalyst ingredients shown above are manganese-containing metal oxides (MnO$_y$). Manganese oxides have the function of decomposing active oxygen species generated. A mixture of silver or a silver alloy and a manganese oxide catalyst may be used. It is preferred to add cerium oxide, zirconium oxide, or the like in order to maintain catalyst dispersion and activity.

The catalyst composition in the invention does not always necessitate conductive support particles for supporting the diamond particles and catalyst particles thereon. However, when carbon particles are used as support particles so as to spread the diamond particles and catalyst particles on these support particles, then the surface area of the catalyst can be effectively enlarged. As the support particles are generally used fine particles of carbon. For example, furnace black, acetylene black, or the like can be used. The particle diameter of such carbon particles is preferably 0.01-1 μm.

Also in the case where the fine carbon powder is used, synthesis is possible by an existing method. For example, silver nitrate is pyrolyzed together with the fine carbon particles, whereby a carbon powder containing catalyst particles highly dispersed therein can be obtained.

The amount of the electrode catalyst in the case of a silver alloy or a manganese oxide is preferably 10-1,000 $g/m^2$ or 0.25-250 $g/m^2$, respectively. In the case where carbon is used as a support, the amount of the silver alloy and that of the manganese oxide are preferably in the ranges of 1-100 $g/m^2$ and 0.0025-25 $g/m^2$, respectively.

Catalyst Paste

In producing the gas diffusion cathode for oxygen reduction of the invention, use can be made of a method in which catalyst particles and diamond particles are mixed with a hydrophobic binder and a solvent such as, e.g., water or naphtha to prepare a paste and this paste is applied to the substrate to fix the particles thereto. The proportion of the catalyst particles to the diamond particles is preferably from 1:0.01 to 1:1 by volume as stated above.

It is especially preferred that the paste should be applied, dried, and burned in several portions, because this operation gives a homogeneous catalyst layer. Examples of the hydrophobic binder include commercial fluororesins such as PTFE, FEP, PFA, and PVDF. It is preferred to add a surfactant having an appropriate concentration for the purpose of evenly dispersing the diamond particles. The surfactant preferably is a nonionic one such as, e.g., Triton.

Electrode Substrate

As the porous conductive substrate, a material such as a cloth, fiber sinter, or the like each made of carbon can be used. It is preferred that the porous conductive substrate should have moderate porosity for the supply and removal of a gas and liquid and further have sufficient electrical conductivity. The substrate preferably has a thickness of 0.01-5 mm, a porosity of 30-95%, and typical pore diameters of 0.001-1 mm.

The carbon cloth may be a fabric woven from bundles each made up of several hundred carbon fibers as thin as several micrometers. This is a material having excellent gas/liquid permeability and it is preferred to use it as the substrate. A carbon paper is a material obtained by forming raw carbon fibers into a thin precursor film by a papermaking process and sintering this precursor. This carbon paper also is a material suitable for use.

The surfaces of the substrate materials shown above generally are hydrophobic, and are preferred materials from the standpoint of supplying oxygen gas. However, from the standpoint of discharging the sodium hydroxide yielded during sodium chloride electrolysis, those substrate materials are unsuitable. Since the hydrophobicity of those materials decrease with the progress of operation, diamond particles having a hydrophobic surface are added in the invention in order to maintain sufficient gas-supplying ability over long. It should, however, be noted that too high hydrophobicity reduces rather than increases the performance because the removal of the sodium hydroxide solution yielded becomes slow. It is therefore desirable to regulate the proportion of the catalyst particles to the diamond particles so as to be within the range shown above.

As stated above, the electrode substrate to be used preferably is a highly conductive material. Although the carbon materials shown above are conductive, their conductivity is poor as compared with that of metals and it is difficult to reduce their resistivity to 1 mΩcm or lower. It is preferred that the substrate material to be used should be subjected to pressing for the purpose of improving performance, especially for the purpose of improving conductivity. Pressing compresses the carbon material to thereby heighten the conductivity of the material as a whole and reduce the change in conductivity which occurs when the electrode is used under pressure. In addition, pressing improves the degree of bonding between the catalyst and the substrate and thereby contributes to an improvement in conductivity. Furthermore, the compression of the substrate and catalyst layer and the improvement in the degree of bonding between the catalyst and substrate improve the ability to supply oxygen gas as a feed material. As an apparatus for the pressing, use can be made of a known apparatus such as a hot press or hot roller. Desirable pressing conditions include a temperature of from room temperature to 360° C. and a pressure of 1-50 $kgf/cm^2$.

Hydrophilic Layer

In the case where the gas diffusion electrode is applied to a two-chamber type large electrolytic cell for sodium chloride electrolysis which has a high current density, disposition of a hydrophilic layer between the membrane and the electrode is effective in holding an electrolytic solution and removing the solution from the reaction field, as stated above. The hydrophilic layer preferably is a porous structure comprising a metal or resin having corrosion resistance. Since it is a member which does not contribute to the electrode reactions, it need not have conductivity. Preferred examples thereof include carbon, ceramics such as zirconium oxide, cerium oxide, and silicon carbide, resins such as hydrophilized PTFE and FEP, and silver as a metal. The shape of the hydrophilic layer preferably is a sheet having a thickness of 0.01-5 mm. It is possible to coat the layer with a manganese oxide for the purpose of preventing an active chemical species from damaging the ion-exchange membrane.

Furthermore, the hydrophilic layer preferably is made of a material which has elasticity and which, when there is an uneven pressure distribution, deforms and buffers the unevenness, because it is disposed between the membrane and the cathode. The hydrophilic layer preferably is made of such a material and has such a structure that the layer always retains a catholyte. According to need, the surface is coated with a hydrophilic material beforehand. Use can be made of, e.g., a sintered plate obtained by a method comprising using a net, woven fabric, nonwoven fabric, foam, or powder as a raw material, molding the raw material into a sheet form together with a pore-forming agent and any of various binder resins, and then removing the pore-forming particles with a solvent. A structure comprising such sintered plates superposed on each other may also be used. Typical pore diameters are preferably 0.005-5 mm.

Thus, a gas diffusion electrode system is constituted which has all of sufficient gas permeability, sufficient hydrophobicity for avoiding wetting by a sodium hydroxide solution, and hydrophilicity for enabling the sodium hydroxide solution to readily pass through the electrode and which further has high conductivity.

Structures of Electrolytic Cells and Methods of Operating the Cells

When the gas diffusion cathode is used in electrolytic cells for sodium chloride electrolysis, an improvement in durability is expected. The electrolytic cells are not limited to two-chamber electrolytic cells of the zero-gap type, and may be any of the three-chamber type and the liquid dropping type. Thus, profitability can be greatly improved.

In disposing the gas diffusion cathode in an electrolytic cell, a conductive support can be used for the purpose of supporting the cathode and helping electrical conduction. The support preferably has suitable evenness and cushioning properties. A known material may be used, such as, e.g., a mesh, spring, blade spring, or web made of a metal such as nickel or stainless steel. In the case where a material other than silver is employed, it is preferred to plate it with silver from the standpoint of corrosion resistance.

For disposing the electrode in an electrolytic cell, it is preferred to use a method in which a membrane, a gas/liquid-permeable layer (hydrophilic layer), the gas diffusion cathode, and a cathode support are united together at a pressure of 0.05-30 kgf/cm$^2$. The gas/liquid-permeable layer and gas diffusion cathode sandwiched between the cathode support and the membrane come to have a fixed positional relationship with each other due to the elasticity of the cathode support and a hydraulic difference attributable to the height of an anolyte. These members may be united with each other before cell fabrication, and this structure may be sandwiched between cell gaskets like the membrane or fixed to a support beforehand.

Industrial Electrolysis

In the case where the electrode of the invention is used for sodium chloride electrolysis, an optimal ion-exchange membrane is a fluororesin membrane from the standpoint of corrosion resistance. The anode preferably is an insoluble electrode made of titanium, which is called DSE or DSA, and preferably is porous so that it can be used in the state of being in tight contact with the membrane. In the case where it is necessary to bring the electrode of the invention into tight contact with the membrane, these members may be mechanically united with each other beforehand. Alternatively, to apply a pressure thereto during electrolysis may suffice. The pressure preferably is 0.05-30 kgf/cm$^2$. Preferred electrolysis conditions include a temperature of 60-95° C. and a current density of 10-100 A/dm$^2$. The amount of oxygen to be supplied is preferably 1.05-2 times the theoretical amount of the oxygen to be consumed by the reduction with four electrons. The oxygen gas is humidified according to need. One method of humidification is to dispose a humidifier heated at 70-95° C. at the cell inlet and pass the oxygen gas therethrough. Thus, the degree of humidification can be regulated at will. In view of the performance of membranes presently on the market, humificiation is unnecessary when the concentration of the anolyte water is kept at 150-200 g/L. On the other hand, in the case of membranes newly developed, humidification is unnecessary. Although the concentration of sodium hydroxide is preferably 25-40 wt %, it is basically determined by the properties of the membrane.

Examples of electrolytic cells for sodium chloride electrolysis which have mounted therein a gas diffusion cathode for oxygen reduction of the invention will be explained below by reference to FIGS. 3 to 5.

Figure 3:
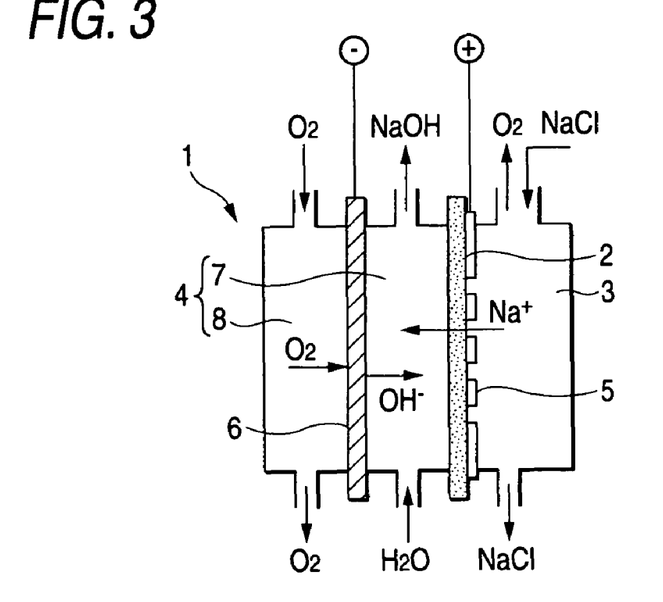
FIG. 3 is a diagrammatic view illustrating a three-chamber type electrolytic cell for sodium chloride electrolysis which has a gas diffusion cathode of the invention mounted therein.

FIG. 3 is a diagrammatic view illustrating a three-chamber type electrolytic cell for sodium chloride electrolysis which has a gas diffusion cathode of the invention mounted therein.

The three-chamber type electrolytic cell 1 has been partitioned into an anode chamber 3 and a cathode chamber 4 with a cation-exchange membrane 2 of the perfluorosulfonic acid type. A porous dimensionally stable anode 5 has been disposed so as to be in tight contact with that side of the cation-exchange membrane 2 which faces the anode chamber 3. A gas diffusion cathode 6 has been disposed on the cathode chamber side of the cation-exchange membrane 2 so as to be spaced apart from the membrane 2. This gas diffusion cathode 6 thus partitions the cathode chamber 4 into a catholyte chamber 7 on the cation-exchange membrane 2 side and a cathode gas chamber 8 on the opposite side. This gas diffusion cathode 6 comprises: a porous conductive substrate obtained by mixing a carbon powder with PTFE and molding the mixture into a sheet form; and an electrode catalyst layer formed on the surface of the substrate by bonding diamond particles and catalyst particles, e.g., silver, thereto with PTFE.

A voltage is applied between the two electrodes while supplying an aqueous sodium chloride solution, a diluted aqueous sodium hydroxide solution, and an oxygen-including gas respectively to the anode chamber 3, catholyte chamber 7, and cathode gas chamber 8 of this electrolytic cell 1. As a result, sodium ions generate in the anode chamber 3, pass through the cation-exchange membrane 2, and reach the catholyte chamber 7. On the other hand, the oxygen contained in the oxygen-including gas supplied to the cathode gas chamber 8 diffuses into the gas diffusion cathode 6 and reacts with water with the aid of the catalyst particles, e.g., silver, in the electrode catalyst layer. The oxygen is thus reduced to hydroxyl ions, which move to the catholyte chamber 7. In the chamber 7, the hydroxyl ions combine with the sodium ions to yield sodium hydroxide. The diamond particles, which have a hydrophobic surface, form a network in the surface of the gas diffusion cathode 6, whereby the gas supply is maintained throughout this electrolysis operation. In addition, the diamond particles serve to impart hydrophobicity to the whole gas diffusion cathode 6, and this prevents the electrode performance from being deteriorated by active oxygen species which can generate. Thus, the electrolysis of sodium chloride can be stably continued over long.

Figure 4:
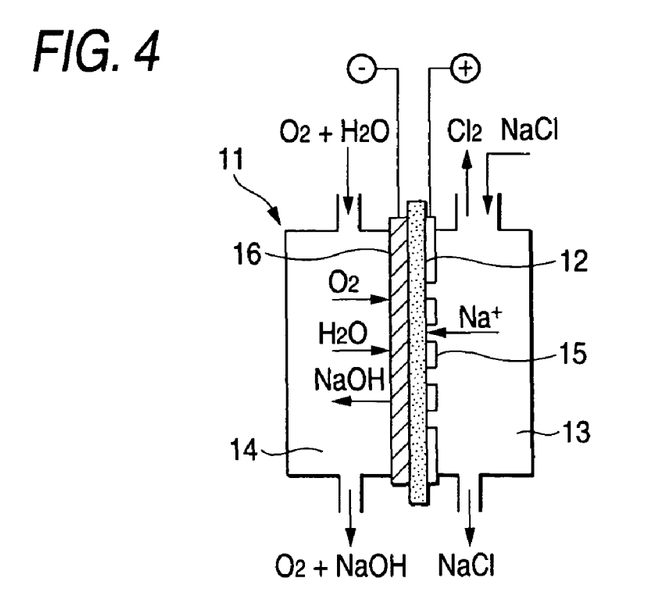
FIG. 4 is a diagrammatic view illustrating a two-chamber type electrolytic cell for sodium chloride electrolysis which has a gas diffusion cathode of the invention mounted therein.

FIG. 4 is a diagrammatic view illustrating a two-chamber type (zero-gap type) electrolytic cell for sodium chloride electrolysis which has a gas diffusion cathode of the invention mounted therein.

The two-chamber type electrolytic cell 11 has been partitioned into an anode chamber 13 and a cathode gas chamber 14 with a cation-exchange membrane 12 of the perfluorosulfonic acid type. A porous dimensionally stable anode 15 has been disposed so as to be in tight contact with that side of the cation-exchange membrane 12 which faces the anode chamber 13. A gas diffusion cathode 16 having the same constitution as in FIG. 3 has been disposed so as to be in tight contact with that side of the cation-exchange membrane 12 which faces the cathode chamber.

A voltage is applied between the two electrodes while supplying an aqueous sodium chloride solution and a humidified oxygen-including gas respectively to the anode chamber 13 and cathode gas chamber 14 of this electrolytic cell 11. As a result, sodium ions generate in the anode chamber 13, pass through the cation-exchange membrane 12, and reach the gas diffusion cathode 16 in the cathode gas chamber 14. On the other hand, the oxygen contained in the oxygen-including gas supplied to the cathode gas chamber 14 is reduced to hydroxyl ions by the action of the silver or silver alloy in the electrode catalyst layer of the gas diffusion cathode 16. These hydroxyl ions combine with the sodium ions to yield sodium hydroxide, which dissolves in the water supplied together with the oxygen-including gas to yield an aqueous sodium hydroxide solution. As in the case of the three-chamber type electrolytic cell for sodium chloride electrolysis, the gas diffusion cathode 16 has a network formed in the surface thereof and the gas supply is maintained throughout this electrolysis operation. In addition, the diamond particles serve to impart hydrophobicity to the whole gas diffusion cathode 16. Thus, the electrolysis of sodium chloride can be stably continued over long.

In the electrolytic cell 11 shown in FIG. 4, a hydrophilic layer may be disposed between the cation-exchange membrane 12 and the gas diffusion cathode 16.

Figure 5:
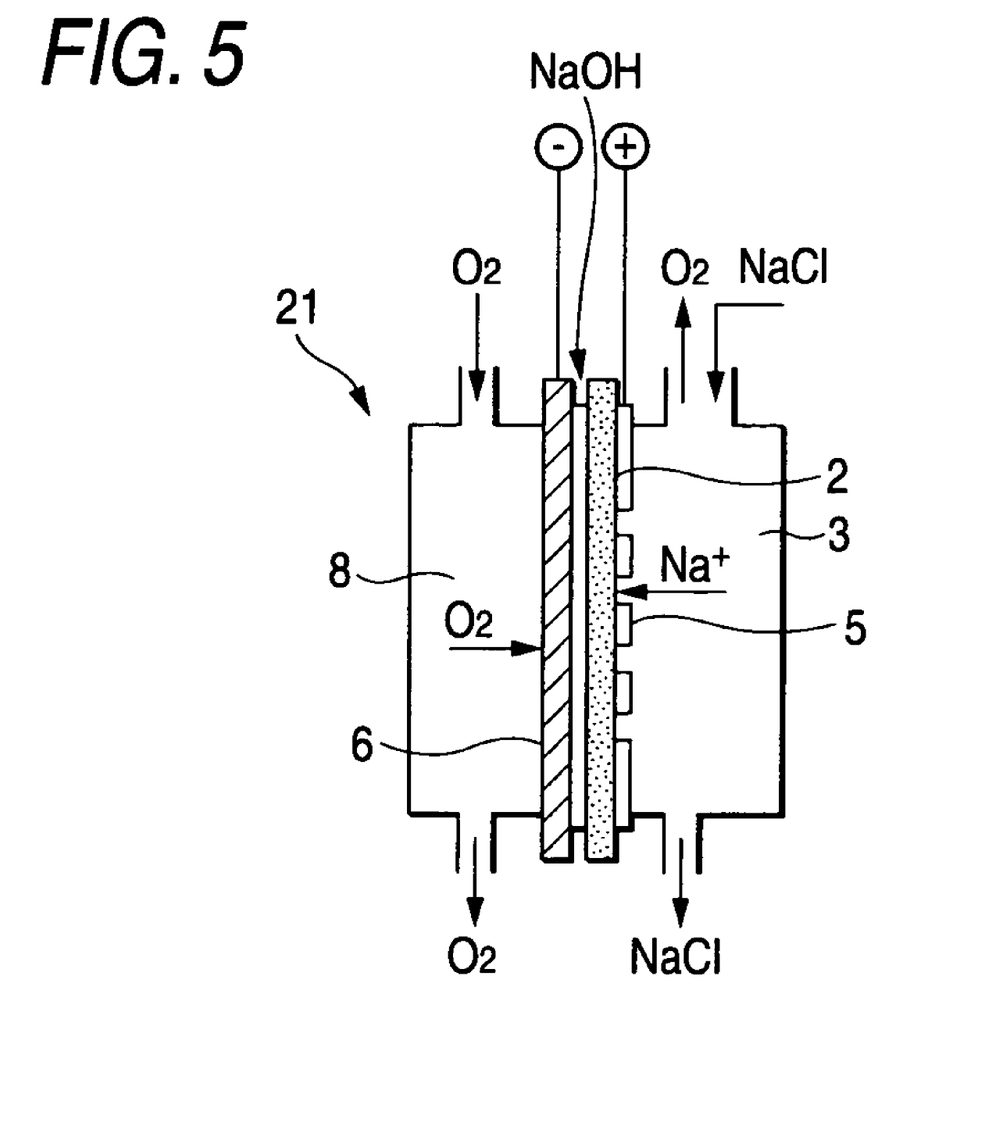
FIG. 5 is a diagrammatic view illustrating an electrolytic cell which has a gas diffusion cathode of the invention mounted therein and is intermediate between the two-chamber type and the three-chamber type.

FIG. 5 is a diagrammatic view illustrating an electrolytic cell which has a gas diffusion cathode of the invention mounted therein and is intermediate between the two-chamber type and the three-chamber type. Like members as in FIG. 3 are designed by like numerals, and explanations thereon are omitted.

This electrolytic cell 21 has substantially the same constitution as the electrolytic cell shown in FIG. 3. The distance between the cation-exchange membrane 2 and the gas diffusion cathode 6 has been reduced to an exceedingly small value to thereby minimize the increase in cell voltage. This constitution further makes it possible to supply a dilute aqueous sodium hydroxide solution to the space between the cation-exchange membrane 2 and the gas diffusion cathode 6.

EXAMPLES

The following are Examples of the method of sodium chloride electrolysis using electrolytic cells for sodium chloride electrolysis having gas diffusion cathodes according to the invention and a Comparative Example. However, the invention should not be construed as being limited thereto.

Example 1

Nanodiamond particles (particle diameter, about 4 nm) were placed in a rotatable cylindrical cell. This cell was rotated at 400° C. for 1 hour while passing a mixed gas composed of fluorine gas and nitrogen gas (volume ratio, 9:1) through the cell to thereby conduct fluorination treatment. It was ascertained through XPS analysis that C—F bonds had been formed.

Silver particles (AgC—H, manufactured by Fukuda Metal Foil Powder Co., Ltd.; particle diameter, 0.1 μm) were evenly mixed with the diamond particles in a molar ratio of 1:0.2. This powder was mixed with an aqueous PTFE suspension (30J, manufactured by Mitsui Fluorochemical Co., Ltd.) in a ratio of 1:1 by volume. The resultant mixture was sufficiently stirred in water containing Triton dissolved therein in an amount of 2% by weight based on the whole of that mixture. The suspension thus obtained was applied to a 0.4 mm-thick carbon cloth substrate in an amount of 500 g per m² of projected area. This substrate was burned in an electric furnace at 310° C. for 15 minutes and then pressed with a pressing machine at a pressure of 2 kgf/cm² to produce a gas diffusion cathode.

A DSE (manufactured by Permelec Electrode Ltd.) comprising ruthenium oxide as the main component and Flemion F8020 (manufactured by Asahi Glass Co., Ltd.) were used as an anode and an ion-exchange membrane, respectively. A carbon cloth which had a thickness of 0.4 mm and had undergone a hydrophilizing treatment was sandwiched as a hydrophilic layer between the gas diffusion cathode and the ion-exchange membrane. The anode was pressed against the gas diffusion cathode so that the electrodes faced inward. The members were brought into tight contact and fixed so that the ion-exchange membrane was vertically located. Thus, an electrolytic cell was constituted.

The sodium chloride concentration in the anode chamber was regulated so that the sodium hydroxide concentration in the cathode chamber became 32 wt %. Oxygen gas was supplied to the cathode at a rate about 1.2 times the theoretical amount to conduct electrolysis at an anolyte temperature of 90° C. and a current density of 60 A/dm². As a result, the initial cell voltage was 2.14 V The electrolysis was continued for 50 days. As a result, no increase in cell voltage and overvoltage from the initial values was observed and a current efficiency of about 95% was maintained.

Example 2

An electrolytic cell was fabricated in the same manner as in Example 1, except that a particulate mixture obtained by evenly mixing the silver particles with the diamond particles in a molar ratio of 1:0.4 was mixed with the aqueous PTFE suspension so that the proportion of the suspension to the particulate mixture was 1:0.8 by volume, and the resultant mixture was used. This cell was operated in the same manner as in Example 1. As a result, the cell voltage was 2.13 V in the initial stage and after 50-days electrolysis.

Example 3

An electrolytic cell was fabricated in the same manner as in Example 1, except that the diamond particles which had not undergone any fluorination treatment were used. This cell was operated in the same manner as in Example 1. As a result, the initial cell voltage was 2.14 V, and the cell voltage after 50-days electrolysis was 2.15 V Example 4

A cell was fabricated in the same manner as in Example 1, except that colloidal silver particles (manufactured by Shinkuyakin Co., Ltd.) were used as a silver catalyst. This cell was operated in the same manner as in Example 1. As a result, the cell voltage was 2.10 V in the initial stage and after 10-days electrolysis.

Comparative Example 1

The same electrolysis test as in Example 1 was conducted, except that the silver/fluororesin proportion was changed to 1:1 by volume and the diamond particles were omitted. As a result, the initial cell voltage was 2.16 V, which increased to 2.18 V through 50-days electrolysis.

While the present invention has been described in detail and with reference to specific embodiments thereof, it will be apparent to one skilled in the art that various changes and modifications can be made therein without departing from the spirit and scope thereof.

The present application is based on Japanese patent application No. 2005-316432 filed on Oct. 31, 2005, and the contents thereof are incorporated herein by reference.

What is claimed is:

1. An oxygen-reduction gas diffusion cathode comprising:
a porous conductive substrate;
individual diamond particles having hydrophobic surfaces; and
a catalyst particle,
the diamond particles and the catalyst particle being disposed on the porous conductive substrate.

2. The oxygen-reduction gas diffusion cathode according to claim 1,
wherein the diamond particle is fluorinated.

3. The oxygen-reduction gas diffusion cathode according to claim 1,
wherein the diamond particle has an insulation property.

4. The oxygen-reduction gas diffusion cathode according to claim 1,
wherein the diamond particle and the catalyst particle are bonded by a fluororesin.

5. The oxygen-reduction gas diffusion cathode according to claim 1,
wherein the diamond particle has a diameter equal to or smaller than that of the catalyst particle.

6. The oxygen-reduction gas diffusion cathode according to claim 1,
wherein the amount of the diamond particles is 0.01 to 1 part by volume with respect to one part by volume of the catalyst particles.

7. A method of sodium chloride electrolysis in an electrolytic cell, the electrolytic cell comprising:
a cathode chamber and an anode chamber partitioned by an ion-exchange membrane;
an oxygen-reduction gas cathode for sodium chloride electrolysis comprising a porous conductive substrate and an electrode catalyst disposed on the porous conductive substrate, the oxygen-reduction gas cathode being disposed in the cathode chamber; and
an anode coated with a platinum group metal oxide, the anode being disposed in the anode chamber, the method comprising
conducting an electrolysis while supplying a sodium chloride solution and an oxygen-including gas to the anode chamber and the cathode chamber, respectively, to produce a sodium hydroxide in the cathode chamber, the electrode catalyst comprising: a diamond particle having a hydrophobic surface;
and a catalyst particle.

* * * * *